United States Patent
Guzman et al.

(10) Patent No.: US 10,509,811 B2
(45) Date of Patent: Dec. 17, 2019

(54) SYSTEM AND METHOD FOR IMPROVED ANALYSIS OF TRAVEL-INDICATING UNSTRUCTURED ELECTRONIC DOCUMENTS

(71) Applicant: Vatbox, Ltd., Herzeliya (IL)

(72) Inventors: Noam Guzman, Ramat Hasharon (IL); Isaac Saft, Kfar Neter (IL)

(73) Assignee: VatBox, Ltd., Herzeliya (IL)

( * ) Notice: Subject to any disclaimer, the term of this patent is extended or adjusted under 35 U.S.C. 154(b) by 0 days.

(21) Appl. No.: 15/668,402

(22) Filed: Aug. 3, 2017

(65) Prior Publication Data
US 2018/0018338 A1    Jan. 18, 2018

Related U.S. Application Data

(63) Continuation-in-part of application No. 15/361,934, filed on Nov. 28, 2016.
(Continued)

(51) Int. Cl.
*G06Q 40/00* (2012.01)
*G06F 16/30* (2019.01)
(Continued)

(52) U.S. Cl.
CPC .......... *G06F 16/30* (2019.01); *G06F 16/5846* (2019.01); *G06F 16/93* (2019.01);
(Continued)

(58) Field of Classification Search
CPC ...................................................... G06Q 40/00
See application file for complete search history.

(56) References Cited

U.S. PATENT DOCUMENTS 5,606,609 A    2/1997    Houser et al.
6,028,970 A    2/2000    DiPiazza et al.
(Continued)

FOREIGN PATENT DOCUMENTS

EP          456491 A2       11/1991
JP       2004280274 A       10/2004
(Continued)

OTHER PUBLICATIONS

City Colleges of Chicago staffs, Local Mileage Reimbursement & Other Local Transportation Policy, Jan. 27, 2012, City Colleges of Chicago, web, 2-11 (Year: 2012).*

(Continued)

*Primary Examiner* — I Jung Liu
(74) *Attorney, Agent, or Firm* — M&B IP Analysts, LLC.

(57) ABSTRACT

A system and method for refund analysis of travel-indicating unstructured electronic documents. The method includes determining, based on data of a first electronic document, a mileage value-added tax (VAT) refund amount, wherein the first electronic document indicates at least one travel transaction; analyzing at least one second electronic document to determine at least one transaction parameter of each second electronic document, wherein each second electronic document includes at least partially unstructured data; creating a template for each of the at least one second electronic document, wherein each template is a structured dataset including the at least one transaction parameter determined for the respective electronic document; determining, based on the created at least one template, a fuel VAT refund amount; and determining, based on the mileage VAT refund amount and the fuel VAT refund amount, an entitled VAT refund amount.

17 Claims, 4 Drawing Sheets

Related U.S. Application Data (60) Provisional application No. 62/371,235, filed on Aug. 5, 2016, provisional application No. 62/260,553, filed on Nov. 29, 2015, provisional application No. 62/261,355, filed on Dec. 1, 2015.

(51) Int. Cl.
| | |
|---|---|
| *G06K 9/00* | (2006.01) |
| *G06K 9/20* | (2006.01) |
| *G06F 16/93* | (2019.01) |
| *G06F 17/24* | (2006.01) |
| *G06F 16/583* | (2019.01) |
| *G06Q 30/06* | (2012.01) |
| *G06F 16/432* | (2019.01) |
| *G06Q 10/10* | (2012.01) |

(52) U.S. Cl.
CPC ....... *G06F 17/248* (2013.01); *G06K 9/00449* (2013.01); *G06K 9/00469* (2013.01); *G06K 9/2072* (2013.01); *G06Q 40/123* (2013.12); *G06F 16/434* (2019.01); *G06K 2209/01* (2013.01); *G06Q 10/10* (2013.01); *G06Q 30/0635* (2013.01)

(56) References Cited

U.S. PATENT DOCUMENTS

| | | |
|---|---|---|
| 6,343,149 B1 | 1/2002 | Motoiwa |
| 6,546,373 B1* | 4/2003 | Cerra ............... G06Q 40/02 705/39 |
| 7,299,408 B1 | 11/2007 | Daconta et al. |
| 7,693,760 B1 | 4/2010 | Fiteni et al. |
| 7,827,079 B2 | 11/2010 | Feldman et al. |
| 8,046,288 B1 | 10/2011 | LeRoux et al. |
| 8,065,611 B1 | 11/2011 | Chan et al. |
| 8,200,642 B2 | 6/2012 | Maze |
| 8,228,299 B1 | 7/2012 | Maloney et al. |
| 8,386,394 B1 | 2/2013 | Nguyen et al. |
| 8,417,017 B1 | 4/2013 | Beutel et al. |
| 8,438,089 B1 | 5/2013 | Wasserblat et al. |
| 8,447,111 B2 | 5/2013 | King et al. |
| 8,639,062 B2 | 1/2014 | Calman et al. |
| 8,798,354 B1 | 8/2014 | Bunzel et al. |
| 8,890,978 B1 | 11/2014 | Madhani et al. |
| 8,996,350 B1 | 3/2015 | Dub et al. |
| 9,141,607 B1 | 9/2015 | Lee et al. |
| 9,158,833 B2 | 10/2015 | Urbschat et al. |
| 9,824,270 B1 | 11/2017 | Mao |
| 2001/0049680 A1 | 12/2001 | Yanagimoto |
| 2002/0091671 A1 | 7/2002 | Prokoph |
| 2002/0138467 A1 | 9/2002 | Jacobson et al. |
| 2003/0088562 A1 | 5/2003 | Dillon et al. |
| 2003/0163778 A1 | 8/2003 | Shores et al. |
| 2003/0212617 A1 | 11/2003 | Stone et al. |
| 2004/0010451 A1 | 1/2004 | Romano et al. |
| 2004/0034554 A1 | 2/2004 | Shirley et al. |
| 2004/0181749 A1 | 9/2004 | Chellapilla et al. |
| 2004/0267620 A1 | 12/2004 | Feldman et al. |
| 2005/0165623 A1 | 7/2005 | Landi et al. |
| 2005/0273614 A1 | 12/2005 | Ahuja et al. |
| 2006/0004814 A1 | 1/2006 | Lawrence et al. |
| 2006/0219773 A1 | 10/2006 | Richardson |
| 2007/0050356 A1 | 3/2007 | Amadio |
| 2007/0168382 A1 | 7/2007 | Tillberg et al. |
| 2007/0237427 A1 | 10/2007 | Patel et al. |
| 2007/0250416 A1 | 10/2007 | Beach et al. |
| 2008/0079979 A1 | 4/2008 | Holt et al. |
| 2008/0082374 A1 | 4/2008 | Kennis et al. |
| 2008/0126155 A1 | 5/2008 | Xu et al. |
| 2008/0183523 A1 | 7/2008 | Dikeman |
| 2008/0219543 A1 | 9/2008 | Csulits et al. |
| 2008/0229187 A1 | 9/2008 | Mahoney et al. |
| 2009/0063470 A1 | 3/2009 | Peled et al. |
| 2009/0112743 A1 | 4/2009 | Mullins et al. |
| 2009/0171958 A1 | 7/2009 | Anderson |
| 2009/0192978 A1 | 7/2009 | Hewett et al. |
| 2009/0228294 A1 | 9/2009 | Choi et al. |
| 2010/0070562 A1 | 3/2010 | Boyer et al. |
| 2010/0106544 A1 | 4/2010 | Frost et al. |
| 2010/0161616 A1 | 6/2010 | Mitchell |
| 2010/0182631 A1 | 7/2010 | King et al. |
| 2010/0211609 A1 | 8/2010 | Xiong et al. |
| 2010/0220929 A1 | 9/2010 | Misawa et al. |
| 2011/0016043 A1 | 1/2011 | Dornseif |
| 2011/0138175 A1 | 6/2011 | Clark et al. |
| 2011/0182500 A1 | 7/2011 | Esposito et al. |
| 2011/0255784 A1 | 10/2011 | Welling et al. |
| 2012/0027246 A1 | 2/2012 | Tifford et al. |
| 2012/0078768 A1 | 3/2012 | King et al. |
| 2012/0133989 A1 | 5/2012 | Glover |
| 2012/0221448 A1 | 8/2012 | Evans et al. |
| 2013/0051671 A1 | 2/2013 | Barton |
| 2013/0179314 A1 | 7/2013 | Stoke et al. |
| 2013/0282725 A1 | 10/2013 | Rubinger |
| 2013/0291127 A1 | 10/2013 | Bergman et al. |
| 2014/0006234 A1 | 1/2014 | Geisau et al. |
| 2014/0067633 A1 | 3/2014 | Venkatasubramanian et al. |
| 2014/0079294 A1 | 3/2014 | Amtrup et al. |
| 2014/0129400 A1 | 5/2014 | Armstrong et al. |
| 2014/0153830 A1 | 6/2014 | Amtrup et al. |
| 2014/0207634 A1 | 7/2014 | Edmonds |
| 2014/0244458 A1* | 8/2014 | Saft ................ G06Q 40/10 705/31 |
| 2014/0344576 A1 | 11/2014 | Johnson |
| 2015/0012339 A1 | 1/2015 | Onischuk |
| 2015/0019409 A1 | 1/2015 | Vagiri |
| 2015/0019586 A1 | 1/2015 | Raichelgauz et al. |
| 2015/0026556 A1 | 1/2015 | Stadermann et al. |
| 2015/0106247 A1 | 4/2015 | Saft et al. |
| 2015/0127534 A1 | 5/2015 | Bhambhani |
| 2015/0235301 A1 | 8/2015 | Brady et al. |
| 2015/0242832 A1 | 8/2015 | Corritori et al. |
| 2015/0248657 A1 | 9/2015 | Loock et al. |
| 2015/0302154 A1 | 10/2015 | Brooks |
| 2015/0324767 A1 | 11/2015 | Walsh et al. |
| 2015/0332283 A1 | 11/2015 | Witchey |
| 2015/0356174 A1 | 12/2015 | Narayana et al. |
| 2015/0356545 A1 | 12/2015 | Marcuccilli et al. |
| 2015/0363893 A1 | 12/2015 | Saft et al. |
| 2015/0378972 A1 | 12/2015 | Kapadia et al. |
| 2015/0379346 A1 | 12/2015 | Newcomer et al. |
| 2016/0042471 A1 | 2/2016 | Barrett et al. |
| 2017/0147540 A1 | 5/2017 | McCormick et al. |
| 2017/0308517 A1 | 10/2017 | Josifovski et al. |
| 2017/0351968 A1 | 12/2017 | Bowers et al. |
| 2018/0012268 A1 | 1/2018 | Simantov et al. |
| 2019/0236128 A1 | 8/2019 | Guzman et al. |
| 2019/0236347 A1 | 8/2019 | Guzman et al. |
| 2019/0244048 A1 | 8/2019 | Saft et al. |

FOREIGN PATENT DOCUMENTS

| | | |
|---|---|---|
| JP | 2008167009 A | 7/2008 |
| JP | 2009157592 A | 7/2009 |
| JP | 2013016097 A | 1/2013 |
| WO | 2010143001 A1 | 12/2010 |
| WO | 2013048790 A1 | 4/2013 |
| WO | 2014132256 A1 | 9/2014 |
| WO | 2016115207 A1 | 7/2016 |

OTHER PUBLICATIONS

A Non-Final Office Action for U.S. Appl. No. 15/013,284 cited by the USPTO on Apr. 4, 2017.

The International Search Report and the Written Opinion for PCT/US2016/016104, ISA/RU, Moscow, Russia, dated Apr. 14, 2016.

The International Search Report and the Written Opinion for PCT/US2016/063828, ISA/RU, Moscow, Russia, dated Apr. 13, 2017.

(56) References Cited

OTHER PUBLICATIONS

The International Search Report and the Written Opinion for PCT/US2016/066845, ISA/RU, Moscow, Russia, dated May 25, 2017.
The International Search Report and the Written Opinion for PCT/US2016/068536, ISA/RU, Moscow, Russia, dated Apr. 13, 2017.
The International Search Report and the Written Opinion for PCT/US2016/068714, ISA/RU, Moscow, Russia, dated May 11, 2017.
The International Search Report and the Written Opinion for PCT/US2017/012120, ISA/RU, Moscow, Russia, dated May 18, 2017.
The International Search Report and the Written Opinion for PCT/US2017/014874, ISA/RU, Moscow, Russia, dated May 18, 2017.
The International Search Report and the Written Opinion for PCT/US2017/015087, ISA/RU, Moscow, Russia, dated Jan. 26, 2017.
The International Search Report and the Written Opinion for PCT/US2017/045488, ISA/RU, Moscow, RU, dated Jan. 11, 2018.
The International Search Report and the Written Opinion for PCT/US2017/055135, ISA/RU, Moscow, RU, dated Jan. 25, 2018.
The International Search Report and the Written Opinion of PCT/US2017/045333, ISA/RU, Moscow, Russia, dated Dec. 28, 2017.
The International Search Report and the Written Opinion of PCT/US2017/045497, ISA/RU, Moscow, Russia, dated Dec. 14, 2017.
The International Search Report and the Written Opinion of the International Searching Authority for PCT/US2016/067716, ISA/RU, Moscow, Russia, dated Jul. 20, 2017.
The International Search Report and the Written Opinion of the International Searching Authority for PCT/US2017/032854, ISA/RU, Moscow, Russia, dated Oct. 12, 2017.
The International Search Report and the Written Opinion of the International Searching Authority for PCT/US2017/032855, ISA/RU, Moscow, Russia, dated Oct. 19, 2017.
The International Search Report and the Written Opinion of the International Searching Authority for PCT/US2017/033106, ISA/RU, Moscow, Russia, dated Oct. 12, 2017.
The International Search Report and the Written Opinion of the International Searching Authority for PCT/US2017/033338, ISA/RU, Moscow, Russia, dated Oct. 26, 2017.
The International Search Report and the Written Opinion of the International Searching Authority for PCT/US2017/043644 ISA/RU, Moscow, Russia, dated Dec. 28, 2017.
The International Search Report and the Written Opinion of the International Searching Authority for PCT/US2017/045338, ISA/RU, Moscow, Russia, dated Dec. 28, 2017.
The International Search Report and the Written Opinion of the International Searching Authority for PCT/US2017/045342, ISA/RU, Moscow, Russia, dated Dec. 28, 2017.
The International Search Report and the Written Opinion of the International Searching Authority for PCT/US2017/045491, ISA/RU, Moscow, Russia, dated Dec. 28, 2017.
The International Search Report and the Written Opinion of the International Searching Authority for PCT/US2017/045554, ISA/RU, Moscow, Russia, dated Dec. 28, 2017.
The International Search Report and the Written Opinion of the International Searching Authority for PCT/US2017/046317, ISA/RU, Moscow, Russia, dated Dec. 28, 2017.
The International Search Report and the Written Opinion of the International Searching Authority for PCT/US2017/056448, ISA/RU, Moscow, Russia, dated Jan. 25, 2018.
The European Search Report for 16869348.9 dated Apr. 2, 2019, EPO, Munich, Germany.
The International Search Report and the Written Opinion for PCT/US2017/064191, dated Feb. 28, 2018, ISA/RU, Moscow, Russia.
The European Search Report for European Application No. 16890887.9, dated Jun. 5, 2019, EPO, Munich, Germany.
The European Search Report for EP Application 17767105.4, Sep. 9, 2019, EPO, Munich, Germany.
The European Search Report for EP Application No: 16894794.3, The European Patent Office, The Hague, dated Aug. 16, 2019.
The First Office Action for Japanese Patent Application No. 2016-574128, Oct. 8, 2019, Japanese Patent Office, Tokyo, Japan.

* cited by examiner

SYSTEM AND METHOD FOR IMPROVED ANALYSIS OF TRAVEL-INDICATING UNSTRUCTURED ELECTRONIC DOCUMENTS

CROSS-REFERENCE TO RELATED APPLICATIONS

This application claims the benefit of U.S. Provisional Application No. 62/371,235 filed on Aug. 5, 2016. This application is also a continuation-in-part of U.S. patent application Ser. No. 15/361,934 filed on Nov. 28, 2016, now pending, which claims the benefit of U.S. Provisional Application No. 62/260,553 filed on Nov. 29, 2015, and of U.S. Provisional Application No. 62/261,355 filed on Dec. 1, 2015. The contents of the above-referenced applications are hereby incorporated by reference.

TECHNICAL FIELD

The present disclosure relates generally to unstructured electronic documents, and more particularly to creating structured datasets for at least partially unstructured electronic documents.

BACKGROUND

Customers can place orders for services such as travel and accommodations from merchants in real-time over the web. These orders can be received and processed immediately. However, payments for the orders typically require more time to complete and, in particular, to secure the money being transferred. Therefore, merchants typically require the customer to provide assurances of payment in real-time while the order is being placed. As an example, a customer may input credit card information pursuant to a payment, and the merchant may verify the credit card information in real-time before authorizing the sale. The verification typically includes determining whether the provided information is valid (i.e., that a credit card number, expiration date, PIN code, and/or customer name match known information).

Upon receiving such assurances, a purchase order may be generated for the customer. The purchase order provides evidence of the order such as, for example, a purchase price, goods and/or services ordered, and the like. Later, an invoice for the order may be generated. While the purchase order is usually used to indicate which products are requested and an estimate or offering for the price, the invoice is usually used to indicate which products were actually provided and the final price for the products. Frequently, the purchase price as demonstrated by the invoice for the order is different from the purchase price as demonstrated by the purchase order. As an example, if a guest at a hotel initially orders a 3-night stay but ends up staying a fourth night, the total price of the purchase order may reflect a different total price than that of the subsequent invoice. Cases in which the total price of the invoice is different from the total price of the purchase order are difficult to track, especially in large enterprises accepting many orders daily (e.g., in a large hotel chain managing hundreds or thousands of hotels in a given country). The differences may cause errors in recordkeeping for enterprises.

As businesses increasingly rely on technology to manage data related to operations such as invoice and purchase order data, suitable systems for properly managing and validating data have become crucial to success. Particularly for large businesses, the amount of data utilized daily by businesses can be overwhelming. Accordingly, manual review and validation of such data is impractical, at best. However, disparities between recordkeeping documents can cause significant problems for businesses such as, for example, failure to properly report earnings to tax authorities.

Some solutions exist for automatically recognizing information in scanned documents (e.g., invoices and receipts) or other unstructured electronic documents (e.g., unstructured text files). Such solutions often face challenges in accurately identifying and recognizing characters and other features of electronic documents. Moreover, degradation in content of the input unstructured electronic documents typically result in higher error rates. As a result, existing image recognition techniques are not completely accurate under ideal circumstances (i.e., very clear images), and their accuracy often decreases dramatically when input images are less clear. Moreover, missing or otherwise incomplete data can result in errors during subsequent use of the data. Many existing solutions cannot identify missing data unless, e.g., a field in a structured dataset is left incomplete.

In addition, existing image recognition solutions may be unable to accurately identify some or all special characters (e.g., "!," "@," "#," "$," "©," "%," "&," etc.). As an example, some existing image recognition solutions may inaccurately identify a dash included in a scanned receipt as the number "1." As another example, some existing image recognition solutions cannot identify special characters such as the dollar sign, the yen symbol, etc.

Further, such solutions may face challenges in preparing recognized information for subsequent use. Specifically, many such solutions either produce output in an unstructured format, or can only produce structured output if the input electronic documents are specifically formatted for recognition by an image recognition system. The resulting unstructured output typically cannot be processed efficiently. In particular, such unstructured output may contain duplicates, and may include data that requires subsequent processing prior to use.

During the course of daily work, employees sometimes use their personal vehicles for travel. Many businesses offer refunds for travel-based expenses and, in particular, mileage-based expenses such as cost of fuel. Mileage allowance payments (MAPs) are payments that are refunded by enterprises for use of their personal vehicles. Because businesses offering MAPs pay for the travel expenses, they may be entitled to value-added tax (VAT) refunds that are paid for travel expenses abroad. Typically, such refunds are limited to refunds on taxes paid for particular travel expenses such as fuel expenses (as opposed to, for example, wear and tear to employee vehicles). To this end, employees of businesses offering MAPs submit expense reports indicating information related to travel expenses in order to provide the information needed to refund the employee and seek any applicable VAT refunds.

The refund requirements vary based on country regulations, car types, and the like. In some countries, the lower amount between the fuel expense and the mileage expense is refunded. For example, if the rate per mile results in a calculated expense of 180 pounds and the actual cost of fuel is 200 Pounds, mileage expense of 180 pounds should be submitted for VAT refund processing purposes. The variations and rules may result in difficulties keeping records, particularly when proof (i.e., receipts) of the transactions needed for submitting VAT reclaims are in the form of unstructured data.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for improved analysis of travel-indicating unstructured electronic documents. The method comprises: determining, based on data of a first electronic document, a mileage value-added tax (VAT) refund amount, wherein the first electronic document indicates at least one travel transaction; analyzing at least one second electronic document to determine at least one transaction parameter of each second electronic document, wherein each second electronic document includes at least partially unstructured data; creating a template for each of the at least one second electronic document, wherein each template is a structured dataset including the at least one transaction parameter determined for the respective electronic document; determining, based on the created at least one template, a fuel VAT refund amount; and determining, based on the mileage VAT refund amount and the fuel VAT refund amount, an entitled VAT refund amount.

Certain embodiments disclosed herein also include a non-transitory computer readable medium having stored thereon instructions for causing a processing circuitry to perform a process, the process comprising: determining, based on data of a first electronic document, a mileage value-added tax (VAT) refund amount, wherein the first electronic document indicates at least one travel transaction; analyzing at least one second electronic document to determine at least one transaction parameter of each second electronic document, wherein each second electronic document includes at least partially unstructured data; creating a template for each of the at least one second electronic document, wherein each template is a structured dataset including the at least one transaction parameter determined for the respective electronic document; determining, based on the created at least one template, a fuel VAT refund amount; and determining, based on the mileage VAT refund amount and the fuel VAT refund amount, an entitled VAT refund amount.

Certain embodiments disclosed herein also include a system for improved analysis of travel-indicating unstructured electronic documents. The system comprises: a processing circuitry; and a memory, the memory containing instructions that, when executed by the processing circuitry, configure the system to: determine, based on data of a first electronic document, a mileage value-added tax (VAT) refund amount, wherein the first electronic document indicates at least one travel transaction; analyze at least one second electronic document to determine at least one transaction parameter of each second electronic document, wherein each second electronic document includes at least partially unstructured data; create a template for each of the at least one second electronic document, wherein each template is a structured dataset including the at least one transaction parameter determined for the respective electronic document; determine, based on the created at least one template, a fuel VAT refund amount; and determine, based on the mileage VAT refund amount and the fuel VAT refund amount, an entitled VAT refund amount.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for improved analysis of travel-indicating unstructured electronic documents. A mileage VAT refund amount is determined based on data extracted from a first expense report electronic document indicating information of a travel transaction. A dataset is created for each of one or more second evidencing electronic documents indicating information evidencing travel transactions. A template of transaction attributes is created based on each evidencing electronic document dataset.

Based on the templates created for the second electronic documents, a fuel VAT refund amount is determined for each evidencing electronic document. Based on the fuel VAT refund amount of the matching evidencing electronic document, the mileage VAT refund amount of the expense report electronic document, and one or more refund rules, it is determined which refund amount is valid. An electronic VAT reclaim may be generated based on the determined valid refund amount.

The disclosed embodiments allow for improved analysis of refunds based on travel transactions indicated in unstructured electronic documents. More specifically, the disclosed embodiments include providing structured dataset templates for electronic documents, thereby allowing for analyzing and comparing data of electronic documents that is unstructured, semi-structured, or otherwise lacking a known structure. Moreover, the structured templates may be used for more efficient comparison of portions of the unstructured electronic document for purposes of determining refunds. For example, the disclosed embodiments may include effectively analyzing images of scanned transaction evidencing documents such as receipts, thereby allowing for more accurate recognition of portions of the unstructured electronic documents indicating specific travel related expenses (e.g., fuel expenses) and, consequently, more accurate determination of refund eligibility.

Figure 1:
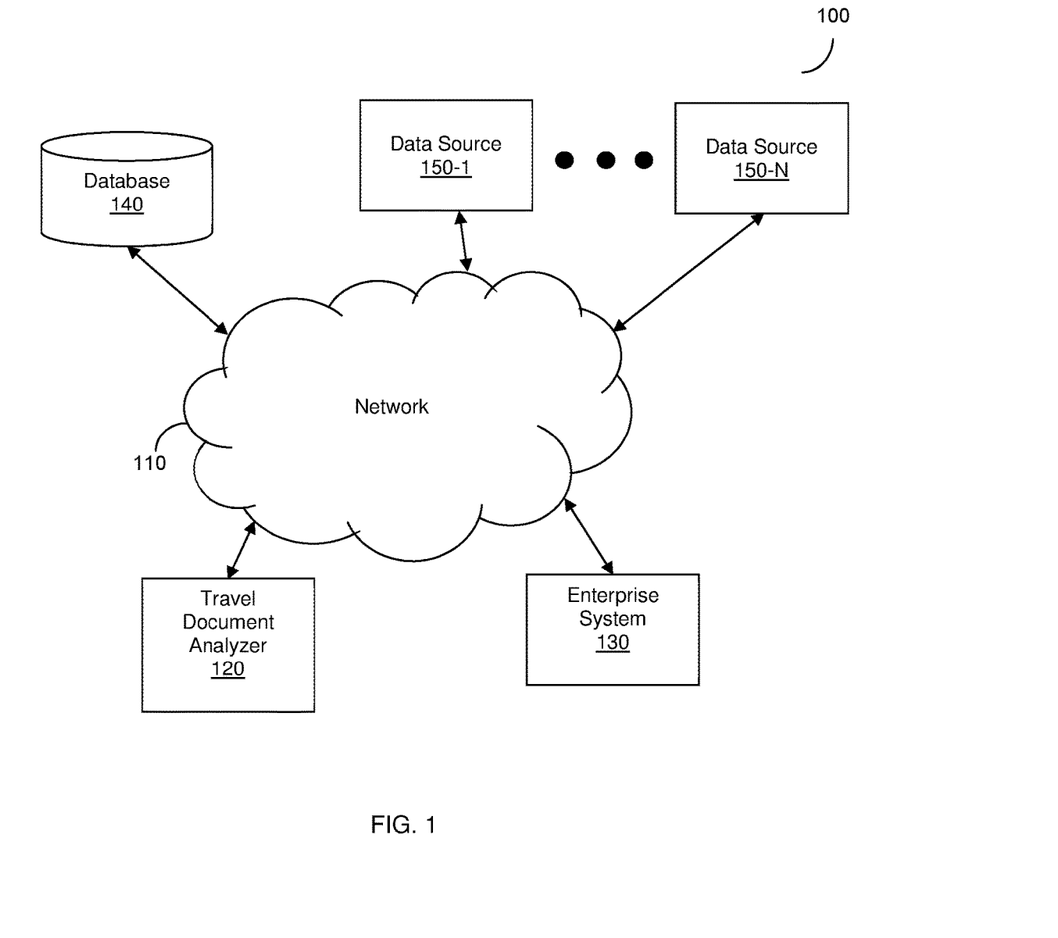
FIG. 1 is a network diagram utilized to describe the various disclosed embodiments.

FIG. 1 shows an example network diagram 100 utilized to describe the various disclosed embodiments. In the example network diagram 100, a travel document analyzer 120, an enterprise system 130, a database 140, and a plurality of data sources 150-1 through 150-N (hereinafter referred to individually as a data source 150 and collectively as data sources 150, merely for simplicity purposes), are communicatively connected via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The enterprise system 130 is associated with an enterprise, and may store data related to purchases made by the enterprise or representatives of the enterprise as well as data related to the enterprise itself. The enterprise system 130 may further store data related to, for example, employee expense reports and receipts for expenses that may have been subject to value-added taxes (VATs). The enterprise may be, but is not limited to, a business whose employees may purchase goods and services subject to VAT taxes while abroad. The enterprise system 130 may be, but is not limited to, a server, a database, an enterprise resource planning system, a customer relationship management system, or any other system storing relevant data.

The data stored by the enterprise system 130 may include, but is not limited to, electronic documents (e.g., an image file showing, for example, a scan of an invoice, a text file, a spreadsheet file, etc.). Each electronic document may show, e.g., an invoice, a tax receipt, a purchase number record, a VAT reclaim request, an expense report, and the like. Data included in each electronic document may be structured, semi-structured, unstructured, or a combination thereof. The structured or semi-structured data may be in a format that is not recognized by the travel document analyzer 120 and, therefore, may be treated as unstructured data.

The database 140 may store electronic VAT reclaim forms generated by the travel document analyzer 120. The database 140 may further store expense report electronic documents and associated evidencing electronic documents as determined by the travel document analyzer 120.

The data sources 150 store at least electronic documents that may be utilized as evidence for granting requests. The data sources 150 may include, but are not limited to, servers or devices of merchants, tax authority servers, accounting servers, a database associated with an enterprise, and the like. As a non-limiting example, the data source 150-1 may be a merchant server of a company which owns gas stations storing image files showing scanned receipts for gasoline purchase transactions made by a merchant associated with the merchant server.

In an embodiment, the travel document analyzer 120 is configured to receive a first expense report electronic document and to extract data from the expense report electronic document. The expense report electronic document indicates data related to one or more transactions. The transactions may include travel-related purchases. In an example implementation, each travel-related purchase includes a purchase of fuel such as gasoline. To this end, the expense report electronic document includes data indicating at least a mileage, a type of vehicle (e.g., a particular make and model of car), and identifying information that may be utilized to uniquely identify each transaction. The mileage may be, for example a number of miles driven in a car by an employee that resulted in the purchase of gasoline to refuel the car. The identifying information may include, but is not limited to, time, price, location, company, transaction identifier, combinations thereof, and the like. As a non-limiting example, the expense report electronic document may indicate a mileage of 1,000 miles during a month, a Subaru Forester® car, and transaction identifiers for each purchase of fuel.

The expense report electronic document may be, for example, submitted by an employee of an enterprise to obtain a refund for travel expenses occurred in the course of his or her job. To this end, the expense report electronic document may be a structured electronic document having defined fields for specific categories of information that are filled manually by the employee. Alternatively, the expense report electronic document may be an unstructured electronic document such as an image of a scanned expense report form, and the travel document analyzer 120 may be configured to create a structured template for the expense report electronic document as described further herein below. Creating a template as described herein for an unstructured expense report allows for more efficient utilization of data therein and more accurate identification of specific data than, for example, via machine imaging alone.

Based on the data extracted from the expense report electronic document, the travel document analyzer 120 is configured to determine a mileage VAT refund amount for the travel transaction of the expense report electronic document. The determination of the mileage VAT refund amount may be further based on one or more mileage VAT refund calculation rules, vehicle type data (e.g., a known engine size of the make and model indicated in the expense report), or both. In some implementations, the mileage VAT refund calculation rules may be retrieved from, e.g., one of the data sources 150, for example a server of a tax authority of the country in which the travel transactions were made. As an example, for a mileage of 1,500 miles by a 1.6 liter gas engine car, the mileage VAT refund rules may indicate that 20% of every 18 pence may be reclaimed for each mile traveled such that a mileage VAT refund of 54 pounds is determined.

The travel document analyzer 120 is configured to create templates based on transaction parameters identified using machine vision of evidencing electronic documents for travel transactions. The travel document analyzer 120 may be configured to retrieve the evidencing electronic documents from, e.g., the enterprise system 130. Based on the created templates, the travel document analyzer 120 is configured to determine whether and which evidencing electronic documents match the expense report electronic document.

In some implementations, the travel document analyzer 120 may be further configured to verify that each determined evidencing electronic document is eligible for use as a VAT reclaim receipt, for example, based on the seller indicated in a "seller" field of the created template and a list of registered VAT merchants for the country indicated in a "location" field of the created template. This allows for ensuring that each transaction submitted for VAT reclaim has a corresponding evidencing electronic document retained to provide subsequent evidence of the transaction. The verification may be further made with respect to a vehicle identifier indicated in the expense report electronic document. Specifically, in an example implementation, only travel transactions to refuel certain vehicles (e.g., vehicles owned by an enterprise, vehicles registered to a tax authority, etc.) may be eligible for refunds.

Determining the matching evidencing electronic documents may include comparing data in the created templates to corresponding data of the expense report electronic document. For example, an evidencing electronic document may match the expense report electronic document if a time of a travel transaction indicated in the expense report matches data in a "time" field of the created template for the evidencing electronic document and a vehicle type indicated in the expense report is compatible with a "fuel type" field of the created template. As another example, an evidencing electronic document may match the expense report electronic document if a transaction identifier indicated in a "transaction ID" field of the created template for the electronic document matches one of the transaction identifiers indicated in the expense report.

To create the templates, the travel document analyzer 120 is configured to create datasets based on electronic documents including data at least partially lacking a known structure (e.g., unstructured data, semi-structured data, or structured data having an unknown structure). To this end, the travel document analyzer 120 may be further configured to utilize optical character recognition (OCR) or other image processing to determine data in the electronic document. The travel document analyzer 120 may therefore include or be communicatively connected to a recognition processor (e.g., the recognition processor 235, FIG. 2).

The travel document analyzer 120 is configured to analyze the created datasets to identify transaction parameters related to transactions indicated in the electronic documents and to create templates based on the created datasets. Each template is a structured dataset including the identified transaction parameters for a transaction.

Based on the created templates, the travel document analyzer 120 is configured to determine a fuel VAT refund for each evidencing electronic document. The fuel VAT refund amounts may be further determined based on fuel VAT refund rules. For example, for a fuel expense of 60 pounds indicated in an evidencing electronic document, the fuel VAT refund amount may be determined to be 20% of 60 pounds, or 12 pounds.

Based on the determined mileage VAT refunds and fuel VAT refunds, the travel document analyzer 120 is configured to determine a total mileage VAT refund amount and a total fuel VAT refund amount for a period of time. The travel document analyzer 120 is further configured to compare the total mileage VAT refund amount to the total fuel VAT refund amount and to determine, based on the comparison, which VAT refund amount is entitled to a refund. The determination of entitlement may be based on one or more regulatory rules stored in, for example, one of the data sources 150 associated with a regulatory authority. In an example implementation, the lower amount between the total fuel VAT refund amount and the total mileage VAT refund amount is entitled to a refund.

The travel document analyzer 120 may be further configured to generate, based on the VAT refund amount determined to be entitled to a refund, an electronic VAT reclaim. The electronic VAT reclaim may be, for example, an electronic document including the entitled VAT refund amount and associated with the matching evidencing electronic documents for the expense report. The travel document analyzer 120 may also be configured to send the generated electronic VAT reclaim to a tax authority server, e.g., one of the data sources 150.

The travel document analyzer 120 may also be configured to validate each analyzed unstructured electronic document based on its respective template. The validation may include, but is not limited to, determining whether each the electronic document is complete and accurate.

Each electronic document may be determined to be complete if, for example, one or more predetermined reporting requirements is met (e.g., for a VAT, reporting requirements may include requiring each of type of goods or services purchased, country of seller, country of buyer, and amount of VAT paid).

Each electronic document may be determined to be accurate based on data stored in at least one external source. The at least one electronic source may include, but is not limited to, the enterprise system 130, one or more of the web sources 150, the database 140, or a combination thereof. Examples of determining accuracy follow.

As an example, the enterprise system 130 may be queried for data related to the enterprise, and the data related to the enterprise may be compared to at least a portion of data of the templates (e.g., data of fields related to enterprise information) to determine whether the at least a portion of the data is accurate.

As another example, the web source 150-7 may be queried for metadata related to an electronic document (e.g., based on a transaction identifier indicated in the electronic document), and the queried metadata may be compared to data of the corresponding template.

As yet another example, the database 140 may be queried for data of previously verified requests, and the previously verified request data may be compared to at least a portion of data of the template to determine whether the at least a portion of data matches the previously verified request data and, therefore, is accurate. This is because previously verified transaction data may be considered to likely be accurate.

It should be noted that the embodiments described herein above with respect to FIG. 1 are described with respect to one enterprise system 130 merely for simplicity purposes and without limitation on the disclosed embodiments. Multiple enterprise systems may be equally utilized without departing from the scope of the disclosure.

Figure 2:
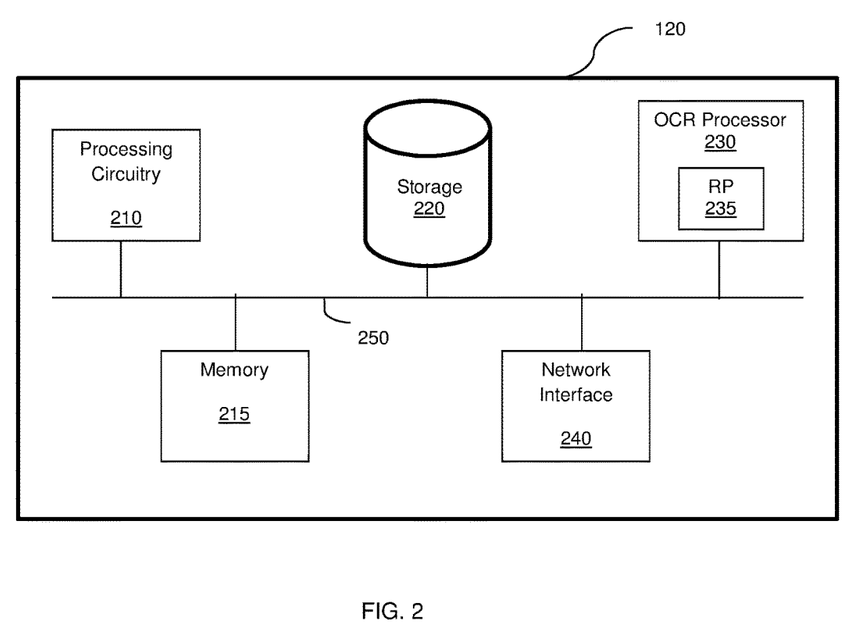
FIG. 2 is a schematic diagram of a travel document analyzer according to an embodiment.

FIG. 2 is an example schematic diagram of the travel document analyzer 120 according to an embodiment. The travel document analyzer 120 includes a processing circuitry 210 coupled to a memory 215, a storage 220, and a network interface 240. In an embodiment, the travel document analyzer 120 may include an optical character recognition (OCR) processor 230. In another embodiment, the components of the travel document analyzer 120 may be communicatively connected via a bus 250.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 215 may be volatile (e.g., RAM, etc.), non-volatile (e.g., ROM, flash memory, etc.), or a combination thereof. In one configuration, computer readable instructions to implement one or more embodiments disclosed herein may be stored in the storage 220.

In another embodiment, the memory 215 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein. Specifically, the instructions, when executed, cause the processing circuitry 210 to perform improved analysis of travel-indicating electronic documents, as discussed herein.

The storage 220 may be magnetic storage, optical storage, and the like, and may be realized, for example, as flash memory or other memory technology, CD-ROM, Digital Versatile Disks (DVDs), or any other medium which can be used to store the desired information.

The OCR processor 230 may include, but is not limited to, a feature and/or pattern recognition processor (RP) 235 configured to identify patterns, features, or both, in unstructured data sets. Specifically, in an embodiment, the OCR processor 230 is configured to identify at least characters in the unstructured data. The identified characters may be utilized to create a dataset including data required for verification of a request.

The network interface 240 allows the travel document analyzer 120 to communicate with the enterprise system 130, the database 140, the data sources 150, or a combination of, for the purpose of, for example, collecting metadata, retrieving data, storing data, and the like.

It should be understood that the embodiments described herein are not limited to the specific architecture illustrated in FIG. 2, and other architectures may be equally used without departing from the scope of the disclosed embodiments.

Figure 3:
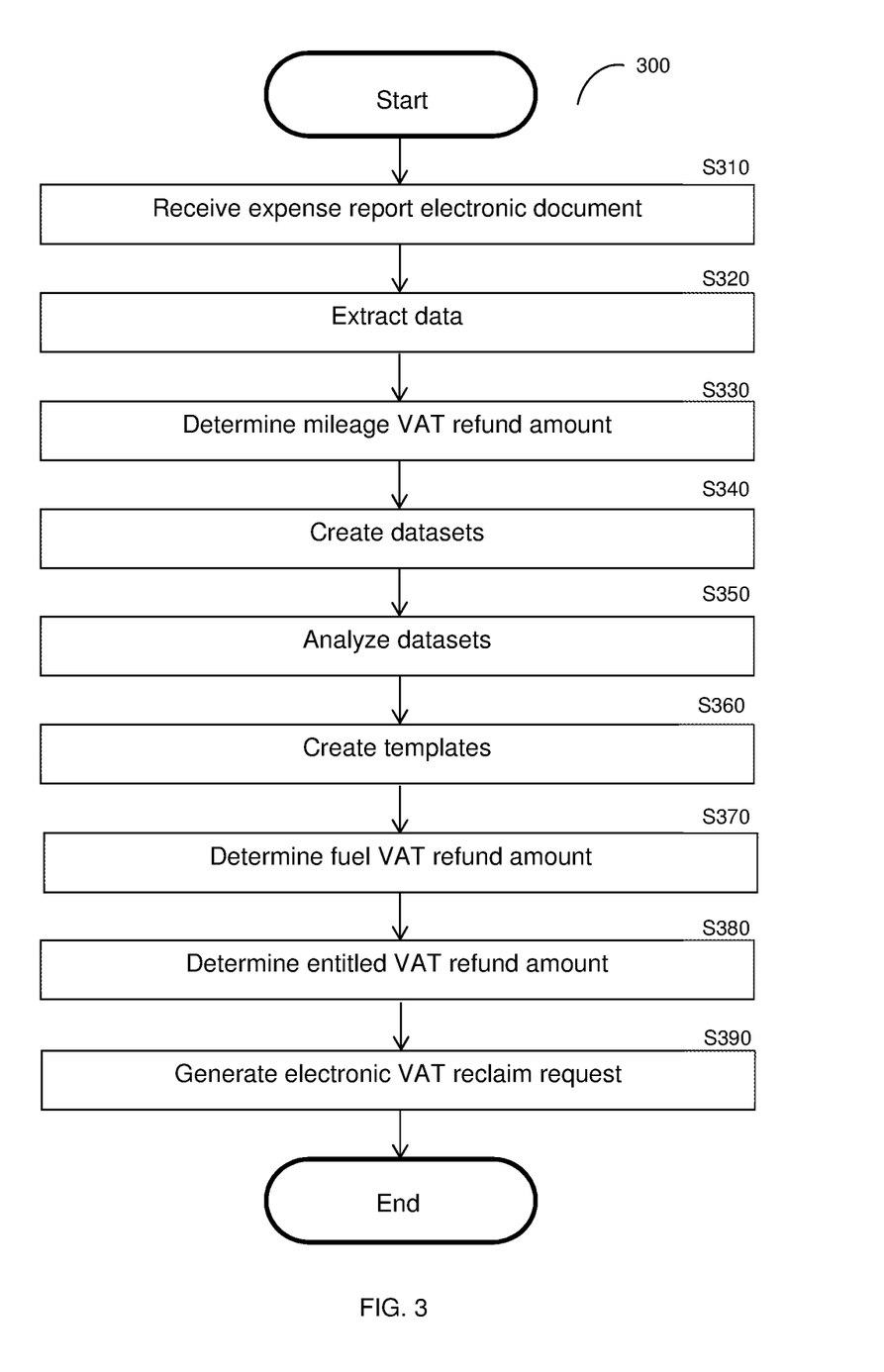
FIG. 3 is a flowchart illustrating a method for improved VAT refund analysis of travel-indicating unstructured electronic documents according to an embodiment.

FIG. 3 is an example flowchart 300 illustrating a method for improved VAT refund analysis of travel-indicating unstructured electronic documents according to an embodiment. In an embodiment, the method may be performed by the travel document analyzer 120.

At S310, a first expense report electronic document is received. The expense report electronic document indicates information related to one or more travel transactions such as, for example, transactions for purchases of fuel. To this end, in an example implementation, the expense report indicates at least a mileage (i.e., a distance traveled), a type of vehicle, and identifying information for the transaction.

At S320, data is extracted from the expense report electronic document. The expense report electronic document may be a structured document from which data is extracted with respect to particular fields, or may be an unstructured electronic document such as an image of a scanned expense report form. When the expense report electronic document is an unstructured electronic document, extracting the data may further include creating a template for the expense report electronic document as described further herein 4.

At S330, based on the extracted data, a mileage VAT refund amount is determined. The mileage VAT refund amount may be determined based on the mileage, the vehicle type, one or more mileage VAT refund calculation rules, or a combination thereof. To this end, S330 may further include retrieving the mileage VAT refund calculation rules from one or more data sources. The mileage VAT refund calculation rules may be retrieved based on, for example, a country of the transaction. The mileage VAT refund amount may be a total mileage VAT refund amount for a period of time, for example, Jan. 1, 2016 through Dec. 31, 2016 (i.e., a year).

At S340, datasets for one or more second evidencing electronic documents are created. Each dataset is created based on an evidencing electronic document that may include, but is not limited to, unstructured data, semi-structured data, structured data with structure that is unanticipated or unannounced, or a combination thereof. For example, the evidencing electronic documents may be images of scanned receipts of gasoline purchases. In an embodiment, S340 may further include analyzing each evidencing electronic document using optical character recognition (OCR) to determine data in the electronic document, identifying key fields in the data, identifying values in the data, or a combination thereof. Creating datasets based on electronic documents is described further herein below with respect to FIG. 4.

At S350, the created datasets are analyzed. In an embodiment, analyzing each dataset may include, but is not limited to, determining transaction parameters such as, but not limited to, at least one entity identifier (e.g., a consumer enterprise identifier, a merchant enterprise identifier, or both), information related to the transaction (e.g., a date, a transaction identifier, a time, a price, a type of good or service sold, an amount of goods purchased, etc.), or both. In a further embodiment, analyzing a dataset may also include identifying a travel transaction based on the dataset.

At S360, a template is created based on each evidencing electronic document dataset. Each template may be, but is not limited to, a data structure including a plurality of fields. The fields may include the identified transaction parameters. The fields may be predefined.

Creating templates from electronic documents allows for faster processing due to the structured nature of the created templates. For example, query and manipulation operations may be performed more efficiently on structured datasets than on datasets lacking such structure. Further, organizing information from electronic documents into structured datasets, the amount of storage required for saving information contained in electronic documents may be significantly reduced. Electronic documents are often images that require more storage space than datasets containing the same information. For example, datasets representing data from 100,000 image electronic documents can be saved as data records in a text file. A size of such a text file would be significantly less than the size of the 100,000 images.

At S370, based on the created templates, a fuel VAT refund amount is determined. The fuel VAT refund amount may be a total fuel VAT refund amount determined based on fuel costs in each evidencing electronic document indicating information related to a corresponding travel transaction of the expense report electronic document. To this end, S370 may include comparing data of the evidencing electronic documents to the expense report electronic document to determine one or more matching evidencing electronic documents, where each matching evidencing electronic document provides evidence of one of the travel transactions indicated in the expense report electronic document. The comparison may be with respect to, for example, particular fields of the created template including transaction identifying information (e.g., transaction identifier number, price, fuel type purchased, combinations thereof, etc.). The fuel VAT refund amount may be a total fuel VAT refund amount for transactions made during the period of time of the mileage VAT refund amount.

At S380, an entitled VAT refund amount is determined based on the determined mileage and fuel VAT refund amounts. The determination may be based on, for example, travel VAT refund rules for a country in which the travel transactions indicated in the expense report were made. In an embodiment, S380 includes comparing the mileage VAT refund amount to the fuel VAT refund amount, where the determination is based on the comparison. For example, the lower VAT refund amount between the mileage and fuel VAT refund amounts may be determined to be the entitled VAT refund amount.

At optional S390, based on the entitled VAT refund amount, an electronic VAT reclaim may be generated. The electronic VAT reclaim may be an electronic document (e.g., a completed fillable electronic document form), and may be generated based on the entitle VAT refund amount and the data related to the transactions as indicated in the expense report electronic document, the created templates, or both.

It should be noted that the embodiments described herein with respect to FIG. 3 are discussed with respect to determining one mileage VAT refund amount and one fuel VAT refund amount to generate one electronic VAT reclaim merely for simplicity purposes and without limitation on the disclosed embodiments. Multiple mileage and fuel VAT refund amounts may be determined, and an electronic VAT reclaim may be generated for each set of mileage and fuel VAT refund amounts. For example, an electronic VAT reclaim may be generated for each fiscal year using a total mileage VAT refund amount and a total fuel VAT refund amount for transactions that were made during each year. As another example, different mileage and fuel VAT refund amounts may be determined based on transactions that were made in different countries (e.g., as indicated in the expense report electronic document or in "location of purchase" fields of the created templates). Different countries typically have different reclaim requirements and rules for travel transactions and, therefore, different sets of travel VAT refund rules may be utilized with respect to travel transactions made in different countries.

It should also be noted that FIG. 3 is described with respect to creating templates for each of the evidencing electronic documents when an expense report is received merely for simplicity purposes and without limitations on the disclosed embodiments. Templates that were previously created as described herein (e.g., based on previous analysis of evidencing electronic documents) and stored in, e.g., a database, may be equally utilized without departing from the scope of the disclosure.

Figure 4:
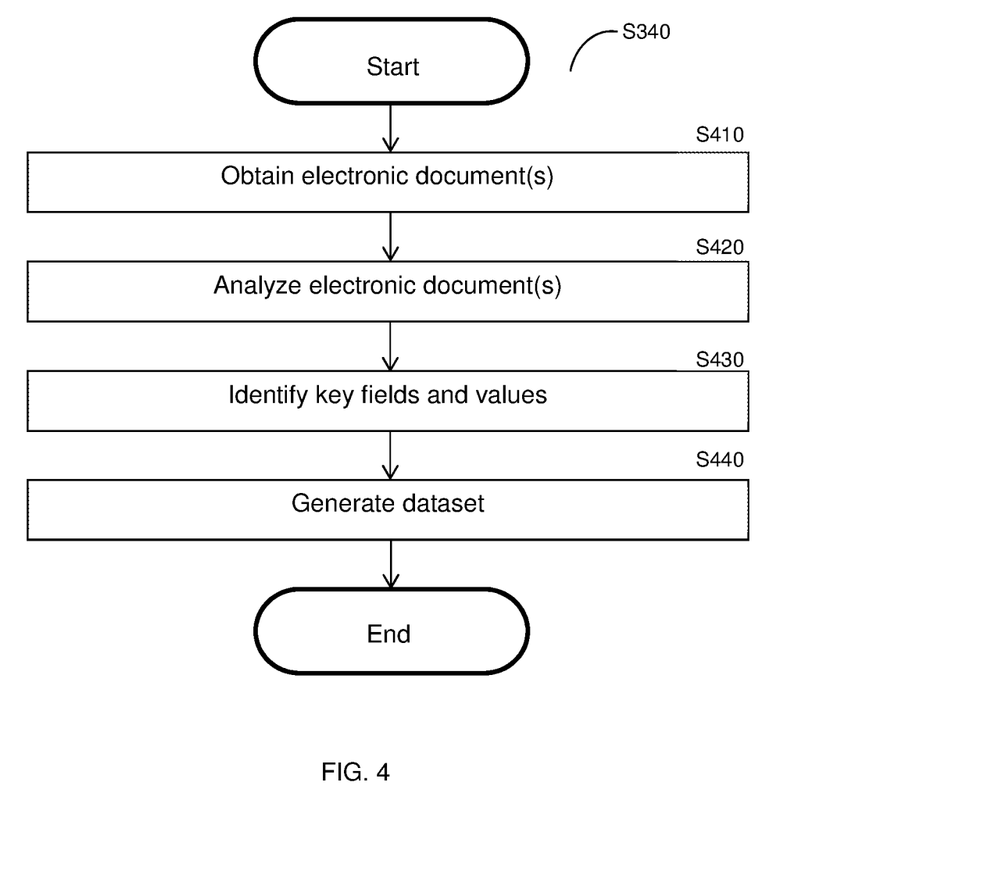
FIG. 4 is a flowchart illustrating a method for creating a dataset based on at least one electronic document according to an embodiment.

FIG. 4 is an example flowchart S340 illustrating a method for creating a dataset based on an electronic document according to an embodiment.

At S410, the electronic document is obtained. Obtaining the electronic document may include, but is not limited to, receiving the electronic document (e.g., receiving a scanned image) or retrieving the electronic document (e.g., retrieving the electronic document from a consumer enterprise system, a merchant enterprise system, or a database).

At S420, the electronic document is analyzed. The analysis may include, but is not limited to, using optical character recognition (OCR) to determine characters in the electronic document.

At S430, based on the analysis, key fields and values in the electronic document are identified. The key field may include, but are not limited to, merchant's name and address, date, currency, good or service sold, a transaction identifier, an invoice number, and so on. An electronic document may include unnecessary details that would not be considered to be key values. As an example, a logo of the merchant may not be required and, thus, is not a key value. In an embodiment, a list of key fields may be predefined, and pieces of data that may match the key fields are extracted. Then, a cleaning process is performed to ensure that the information is accurately presented. For example, if the OCR would result in a data presented as "1211212005", the cleaning process will convert this data to 12/12/2005. As another example, if a name is presented as "Mo$den", this will change to "Mosden". The cleaning process may be performed using external information resources, such as dictionaries, calendars, and the like.

In a further embodiment, it is checked if the extracted pieces of data are completed. For example, if the merchant name can be identified but its address is missing, then the key field for the merchant address is incomplete. An attempt to complete the missing key field values is performed. This attempt may include querying external systems and databases, correlation with previously analyzed invoices, or a combination thereof. Examples for external systems and databases may include business directories, Universal Product Code (UPC) databases, parcel delivery and tracking systems, and so on. In an embodiment, S430 results in a complete set of the predefined key fields and their respective values.

At S440, a structured dataset is generated. The generated dataset includes the identified key fields and values.

It should be noted that various embodiments described herein are discussed with respect to particular electronic documents such as expense reports and receipts merely for simplicity purposes and without limitation on the disclosed embodiments. Any electronic documents including travel related data and, specifically, electronic documents that include unstructured data, may be utilized in accordance with the scope of the disclosure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for improved analysis of travel-indicating unstructured electronic documents, comprising:
   determining, based on data of a first electronic document, a mileage value-added tax (VAT) refund amount, wherein the first electronic document indicates at least one travel transaction;
   analyzing at least one second electronic document to determine at least one transaction parameter of each second electronic document, wherein each second electronic document includes at least partially unstructured data;
   creating a template for each of the at least one second electronic document, wherein each template is a structured dataset including the at least one transaction parameter determined for the respective electronic document;
   determining, based on the created at least one template, a fuel VAT refund amount; and
   determining, based on the mileage VAT refund amount and the fuel VAT refund amount, an entitled VAT refund amount;
   wherein determining the at least one transaction parameter for an electronic document further comprises:
   identifying, in the electronic document, at least one key field and at least one value;
   creating, based on the electronic document, a dataset, wherein the created dataset includes the at least one key field and the at least one value; and
   analyzing the created dataset, wherein the at least one transaction parameter is determined based on the analysis.

2. The method of claim 1, wherein identifying the at least one key field and the at least one value further comprises:
   analyzing the electronic document to determine data in the electronic document; and
   extracting, based on a predetermined list of key fields, at least a portion of the determined data, wherein the at least a portion of the determined data matches at least one key field of the predetermined list of key fields.

3. The method of claim 2, wherein analyzing each second electronic document further comprises:
   performing optical character recognition on the second electronic document.

4. The method of claim 1, further comprising:
   generating, based on the first electronic document and the created at least one template, a VAT reclaim request, wherein the VAT reclaim request is an electronic document indicating the entitled VAT refund amount.

5. The method of claim 1, further comprising:
   extracting the data from the first electronic document; and
   creating a template based on the data extracted from the first electronic document, wherein the mileage VAT refund amount is determined based further on the template created for the first electronic document.

6. The method of claim 1, further comprising:
   comparing the created at least one template to the first electronic document to determine at least one matching second electronic document.

7. The method of claim 1, wherein the entitled VAT refund amount is the lower of the mileage VAT refund amount and the fuel VAT refund amount.

8. The method of claim 1, wherein the first electronic document is an expense report electronic document, wherein the second electronic document is an image showing a scanned receipt.

9. A non-transitory computer readable medium having stored thereon instructions for causing a processing circuitry to perform a process, the process comprising:
   determining, based on data of a first electronic document, a mileage value-added tax (VAT) refund amount, wherein the first electronic document indicates at least one travel transaction;
   analyzing at least one second electronic document to determine at least one transaction parameter, wherein each second electronic document includes at least partially unstructured data;
   creating a template for each of the at least one second electronic document, wherein each template is a structured dataset including the at least one transaction parameter determined for the respective electronic document;
   determining, based on the created at least one template, a fuel VAT refund amount; and
   determining, based on the mileage VAT refund amount and the fuel VAT refund amount, an entitled VAT refund amount;
   wherein determining the at least one transaction parameter for an electronic document further comprises:
   identifying, in the electronic document, at least one key field and at least one value;
   creating, based on the electronic document, a dataset, wherein the created dataset includes the at least one key field and the at least one value; and
   analyzing the created dataset, wherein the at least one transaction parameter is determined based on the analysis.

10. A system for refund analysis of travel-indicating unstructured electronic documents, comprising:
    a processing circuitry; and
    a memory, the memory containing instructions that, when executed by the processing circuitry, configure the system to:
    determine, based on data of a first electronic document, a mileage value-added tax (VAT) refund amount, wherein the first electronic document indicates at least one travel transaction;
    analyze at least one second electronic document to determine at least one transaction parameter for each second electronic document, wherein each second electronic document includes at least partially unstructured data;

create a template for each of the at least one second electronic document, wherein each template is a structured dataset including the at least one transaction parameter determined for the respective electronic document;

determine, based on the created at least one template, a fuel VAT refund amount; and determine, based on the mileage VAT refund amount and the fuel VAT refund amount, an entitled VAT refund amount wherein the system is further configured to:

identify, in the electronic document, at least one key field and at least one value;

create, based on the electronic document, a dataset, wherein the created dataset includes the at least one key field and the at least one value; and analyze the created dataset, wherein the at least one transaction parameter is determined based on the analysis.

11. The system of claim 10, wherein the system is further configured to:

analyze each second electronic document to determine data in the electronic document; and extract, based on a predetermined list of key fields, at least a portion of the determined data from each second electronic document, wherein the at least a portion of the determined data matches at least one key field of the predetermined list of key fields of the second electronic document.

12. The system of claim 11, wherein the system is further configured to:

perform optical character recognition on each second electronic document.

13. The system of claim 10, wherein the system is further configured to:

generate, based on the first electronic document and the created at least one template, a VAT reclaim request, wherein the VAT reclaim request is an electronic document indicating the entitled VAT refund amount.

14. The system of claim 10, wherein the system is further configured to:

extract the data from the first electronic document; and create a template based on the data extracted from the first electronic document, wherein the mileage VAT refund amount is determined based further on the template created for the first electronic document.

15. The system of claim 10, wherein the system is further configured to:

compare the created at least one template to the first electronic document to determine at least one matching second electronic document.

16. The system of claim 10, wherein the entitled VAT refund amount is the lower of the mileage VAT refund amount and the fuel VAT refund amount.

17. The system of claim 10, wherein the first electronic document is an expense report electronic document, wherein the second electronic document is an image showing a scanned receipt.

* * * * *